United States Patent [19]

Serlet

[11] Patent Number: 5,355,483
[45] Date of Patent: Oct. 11, 1994

[54] ASYNCHRONOUS GARBAGE COLLECTION

[75] Inventor: Bertrand Serlet, Paris, France

[73] Assignee: NeXT Computers, Redwood City, Calif.

[21] Appl. No.: 732,453

[22] Filed: Jul. 18, 1991

[51] Int. Cl.$^5$ ............................................. G06F 12/00
[52] U.S. Cl. .................... 395/650; 395/425;
    364/DIG. 1; 364/281.1; 364/281.3; 364/281.4;
    364/282
[58] Field of Search ............... 395/325, 425, 600, 400,
    395/800, 575, 650

[56] References Cited

U.S. PATENT DOCUMENTS

| | | | |
|---|---|---|---|
| 4,598,361 | 7/1986 | Logsdon et al. | 395/400 |
| 4,648,065 | 3/1987 | Zenk et al. | 395/425 |
| 4,685,125 | 8/1987 | Zave | 379/96 |
| 4,755,939 | 7/1988 | Watson | 395/600 |
| 4,775,932 | 10/1988 | Oxley et al. | 395/600 |
| 4,807,120 | 2/1989 | Courts | 395/425 |
| 4,814,971 | 3/1989 | Thatte | 395/575 |
| 4,888,681 | 12/1989 | Barnes et al. | 395/600 |
| 4,907,151 | 3/1990 | Bartlett | 395/425 |
| 4,912,629 | 3/1990 | Shuler, Jr. | 395/600 |
| 4,951,194 | 8/1990 | Bradley et al. | 395/425 |
| 4,961,137 | 10/1990 | Augusteijn et al. | 395/800 |
| 4,989,134 | 1/1991 | Shaw | 395/425 |
| 4,989,137 | 1/1991 | Oxley et al. | 395/400 |
| 5,088,036 | 2/1992 | Ellis et al. | 395/425 |
| 5,093,782 | 3/1992 | Muraski et al. | 395/600 |
| 5,109,336 | 4/1992 | Guenther et al. | 395/425 |
| 5,241,673 | 8/1993 | Schelvis | 395/425 |

OTHER PUBLICATIONS

"Real-time Concurrent Collection on Stock Multiprocessors" Appel et al Jun. 1988 pp. 11-20.

Primary Examiner—Allen R. MacDonald
Assistant Examiner—Ayaz R. Sheikh
Attorney, Agent, or Firm—Hecker & Harriman

[57] ABSTRACT

The present invention consists of a new type of garbage collector, one that runs in a different process being scanned. With this method, the process being collected communicates its memory state ("a memory snapshot") to a garbage collecting process (GC), and the GC process scans the memory and sends back the information about garbage. As a result, the present invention permits garbage collection to be performed asynchronously. The process being scanned for garbage is interrupted only briefly, to obtain the memory snapshot. The process then runs without interruption while the garbage collection is being performed. The present invention makes the assumption that if an object is garbage at the time of the memory snapshot it remains garbage any time later, since new pointers to that object cannot be created during asynchronous collection. The method further considers the case where the results of a cache computation is a collectable object itself. The method includes keeping a list while a collection is in progress of all the objects being given away from the cache. When an object is received as garbage from the GC, it is only freed if it is not on the list. The garbage collecting process is performed using a conservative scan. The garbage collector finds out if an object is garbage by scanning the memory address space and comparing the value found in each scanned memory address to see if the value matches the candidate for garbage. If no match is found, this means that the candidate for garbage is not referenced and therefore, is garbage.

16 Claims, 7 Drawing Sheets

Prior Art

ASYNCHRONOUS GARBAGE COLLECTION

BACKGROUND OF THE PRESENT INVENTION

1. Field of the Invention

This invention relates to memory management in computer systems, and more particularly to garbage collection in a memory system.

2. Background Art

A typical computer system consists of a number of modules or components. Computer systems typically include a central processing unit (CPU) such as a microprocessor. The microprocessor is a program-controlled device that obtains, decodes and executes instructions. A computer system also includes program storage components for storing program instructions, and data storage components for storing data. These storage components may be read only memory (ROM), random access memory (RAM), disk or tape storage, or any other suitable storage means.

A computer system typically also includes input/output (I/O) components for connecting external devices to the microprocessor. Special purpose components, such as memory management units or co-processors, may also be part of the computer system.

The memory component, also known as a "main memory," is a scarce resource that is dynamically allocated to users, programs or processes. Main memory is typically a silicon-based memory such as a RAM. In many applications, dynamic random access memory (DRAM) is used as the main memory. Processor main memory is "byte" organized. That is, memory is arranged as a sequence of 8-bit bytes and the byte is the smallest unit of information accessed out of the memory. In one convention, an entire row is selected by a row address and columns are accessed in groups of 8 bits. In some implementations, 16-bit words (2 bytes) or 32-bit words (4 bytes) are accessed at one time. The bytes or words in the memory which are uniquely addressable make up the address space of the memory.

Within the computer system, the processor uses associated memory storage locations for the temporary storage of data and/or instructions. The contents of the memory are changing over time so that, at different times, a memory location may be "allocated" (used) or "unallocated" (unused).

Allocated memory locations are those locations that contain instructions or data such as program code, or those that are referenced, ("pointed to"), by another allocated location. Locations that point to other locations are known as "pointers" and include the address of the location they point to as part of their stored information. The memory addresses of unallocated locations are not found in the storage space of other locations unless, by coincidence, the data stored at another location is the binary equivalent of the unallocated memory address. Unallocated memory locations constitute reclaimable or usable memory space.

To promote efficient memory usage, unallocated memory locations must be "reclaimed" so that they can be allocated. The identification and reclaiming of unallocated memory locations is known as "garbage collection," and can be accomplished by a variety of methods. A system or method for performing such garbage collection is referred to as a "garbage collector."

In one method, a garbage collector in a computer system determines if an object is garbage by scanning the entire address space of memory and comparing the value found in each scanned memory address to a memory address that is a candidate for garbage. If no match is found, the candidate for garbage is not referenced and therefore, is garbage. If a match is found, it is assumed that the memory location is referenced and therefore not garbage. Coincidental matches fall under this assumption and are not collected. Therefore, in the worst case, some "garbage" may elude collection, but no referenced locations are mistakenly collected. For this reason, this method is known as a "conservative scan." It is also called a "mark and sweep" method, because the collector processes all addresses, marking the ones that are free for allocation, then the collector places the marked addresses on a "free" list. The time required to complete this process is proportional to the size of the memory being collected.

In the past, computer systems operated on relatively small memory spaces, and the reclamation of memory space was not a significant problem. When the memory was in need of garbage collection, the CPU processes were halted and a garbage collection process, such as a conservative scan, was performed. Presently, however, larger memories are being implemented, especially with applications that are memory intensive. Thus, the problems associated with garbage collection have become of greater significance. It is desirable to have a garbage collecting process which does not require an extended interruption of CPU processes.

One method for performing garbage collection without extended interruptions involves using a reference count for each memory address. This method is described in U.S. Pat. No. 4,912,629 to Robert Shuler, Jr. The reference count indicates the number of other addresses that include a pointer to that address. Whenever a new pointer to an address is created, the reference count of the address is incremented by one, and whenever an existing pointer is destroyed, the reference count of the address to which it points is decremented by one. Addresses whose reference counts become equal to zero are reclaimed by adding them to a list of free addresses.

Reference counting has a desirable feature in that garbage collection is accomplished at the earliest possible moment. Furthermore the reclamation is spread over time rather than being executed in a single long, and potentially disruptive, operation. However, reference counting cannot reclaim unused data objects that are linked into a circular structure nor data objects whose reference counts have overflowed. Also, the computational effort expended with reference counting is proportional to the number of dead data objects in the systems memory, placing large demands upon the system CPU. Another problem exhibited by the reference count method is one of timing. For example, consider the multi-processor system shown in FIG. 1.

Figure 1:
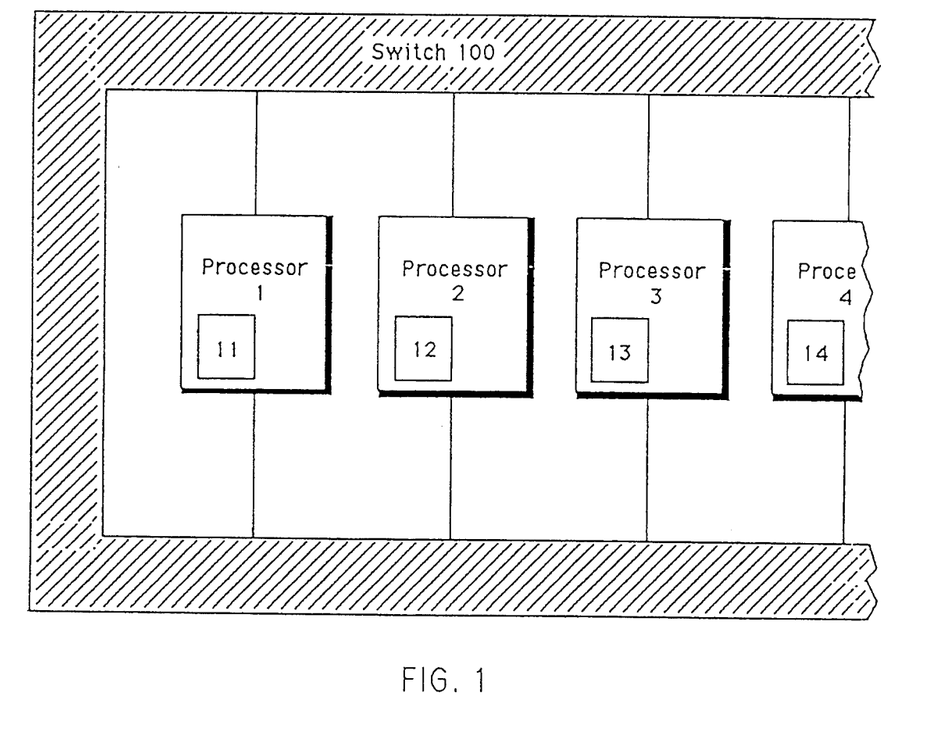
FIG. 1 illustrates a multi-processor computer system.

FIG. 1 shows a multi-processor distributed computer system. The system comprises a plurality of processors (processor 1, processor 2, etc.) interconnected by a switch (100) that allows messages to be passed between the processors. Each processor includes a memory (11, 12, 13, etc.) for holding programs and data words. Each processor performs operations based upon the programs within its memory and the messages sent from other processors. It is possible in this system for memory words in one processor to point to words in another processor. A first processor containing a pointer sends messages via switch 100 to a second processor containing the word referenced by the pointer for the purpose of notifying the second processor when to increment and decrement the reference count of the referenced word.

Figure 2A:
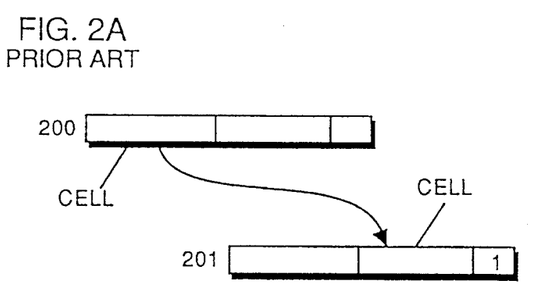
FIGS. 2A–2C illustrate a memory cell "reference count" garbage collection method of the prior art.
Figure 2B:
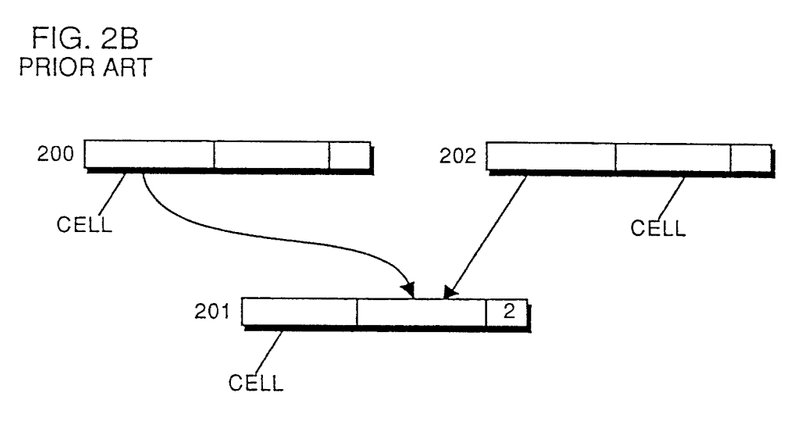
Figure 2C:
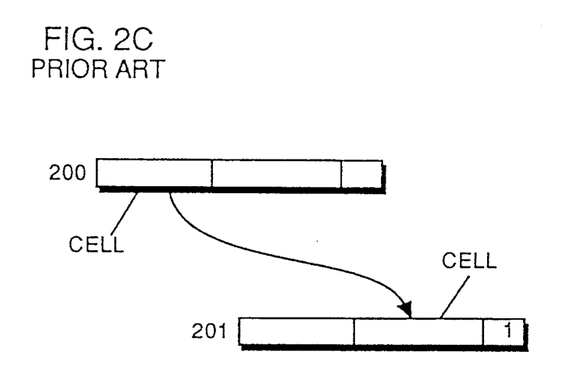

In this system, different words in a reference graph structure may reside in different processors. For example, in FIGS. 2A–2C, words 200 and 201 may reside in processor 1, while word 202 resides in processor 2. In the initial situation, word 200 points to word 201, giving word 201 a reference count of one (FIG. 2A). When word 202 is created, processor 2 sends a message to processor 1, telling it to increment the reference count of word 201 (FIG. 2B). Similarly, when word 202 is destroyed, processor 2 sends a second message to processor 101, telling it to decrement the reference count of word 201 (FIG. 2C). Each message takes a finite time to reach processor 1, thus an error can occur if the second message is acted upon before the first message.

Figure 3A:
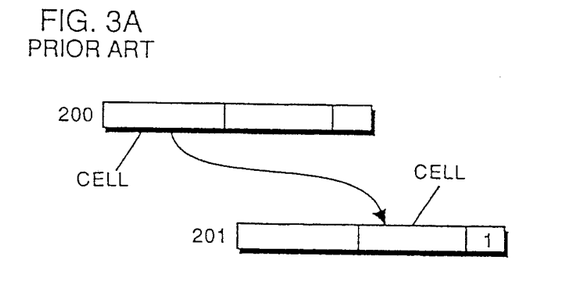
FIGS. 3A–3D illustrate a problem in the reference count system of the prior art.
Figure 3B:
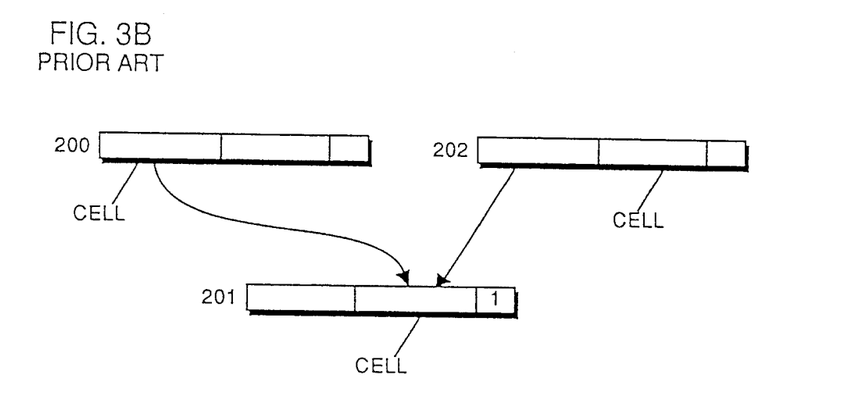
Figure 3C:
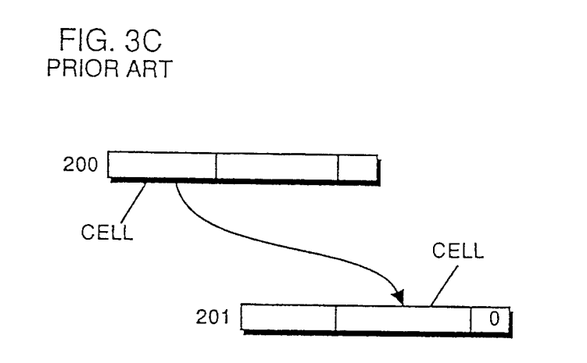
Figure 3D:
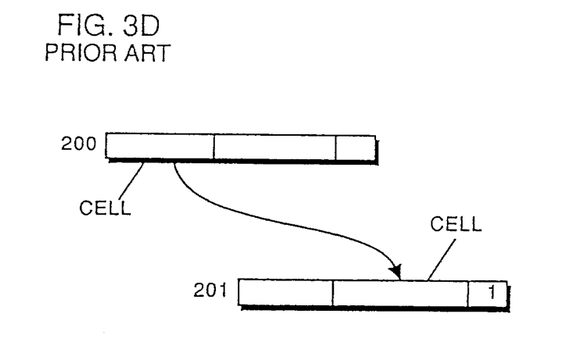

FIGS. 3A–3D show what happens when the messages are acted upon in the wrong order. FIG. 3A shows the same initial situation as in FIG. 2A. In FIG. 3B, word 202 has been created, with a pointer to word 201, but the message to increment the reference count of word 201 has not yet arrived. In FIG. 3C, word 202 has been garbage collected, and the message to decrement the reference count of word 201 has arrived; the reference count for word 201 is, therefore, now zero. Finally, in FIG. 3D, the first message has now arrived, causing the reference count of word 201 to be incremented to one.

If a garbage collection occurs while the situation of FIG. 3C exists, word 201 is collected in error, and the reference count is incorrect from then on. Reference count systems designed to avoid this issue are very complex in their implementation. It is desirable to have a garbage collecting process that is reliable and simplistic in design.

U.S. Pat. No. 4,755,939 to Watson describes a computer system having memory cells (or words) organized in a directed graph structure by means of pointers. Each cell has a reference count, and each pointer has a weight value. If a new pointer to a cell is created by copying an existing pointer, the new and existing pointers are given weights whose sum equals the old value of the existing pointer. In this way, the sum of the weights of the pointers to any cell are maintained equal to its reference count. When a pointer is destroyed, the reference count of the cell to which it points is reduced by the weight of the pointer. When the reference count of a cell reaches zero, it is reclaimed (garbage-collected) for re-use.

U.S. Pat. No. 4,757,438 to Thatte et al. describes a computer system which enables automatic memory operations independently of the CPU. The computer system includes a virtual machine and a logical memory system which is accessed by the virtual machine through a binding registry unit.

Figure 4A:
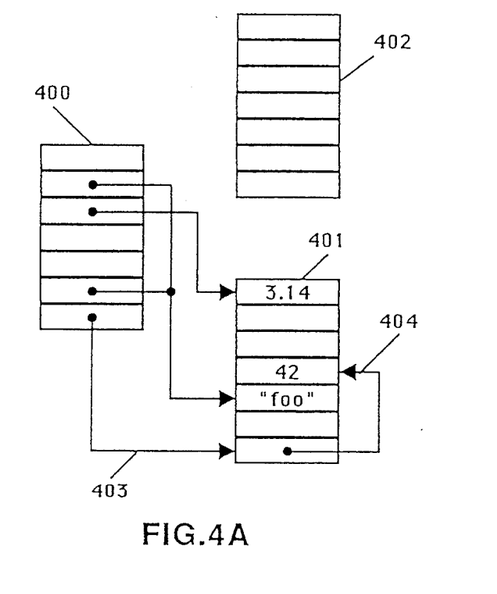
FIGS. 4A–4D illustrate a "stop and copy" garbage collection method of the prior art.
Figure 4B:
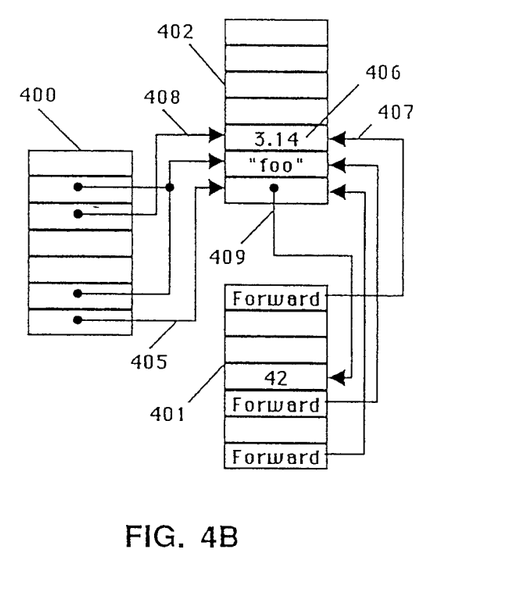

Another method used in many commercial list processing systems, described in U.S. Pat. No. 4,775,932 to Oxley et al., is known as "stop and copy", which works by copying live data objects from the space being collected into an unused space. With reference to FIGS. 4A–4D, this method separates the memory into two equally-sized spaces (401,402). All allocation takes place from one of the spaces known as "oldspace" (401). The second space (402), known as "newspace", remains empty until garbage collection begins. When oldspace 401 is completely allocated, the user computation is stopped and garbage collection begins (FIG. 4A–4B).

The base set 400 is scanned looking for references (i.e. 403) into oldspace 401. When a reference is found, the collector determines if there is a forwarding pointer (i.e. 404) where the data object should be. If there is a forwarding pointer (i.e. 405), the original reference is updated to point where specified by the forwarding pointer and the collector proceeds with the scan of the base set 400. If the data object (i.e. "3.14") is in oldspace 401, it is copied to the next available location (406) in newspace 402, a forwarding pointer (407) is placed at the old location in oldspace 401 to indicate where the data object was copied to, and the original reference (408) is updated to reference the moved data object.

Figure 4C:
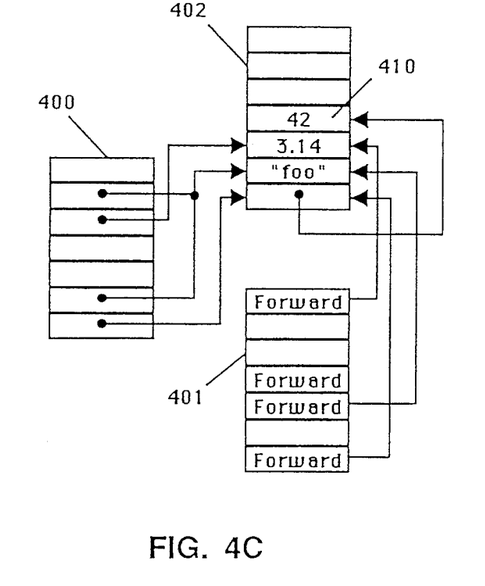

When the base set has been completely scanned, newspace can be linearly scanned for references (409) from copied objects into oldspace 401. As references are found into oldspace 401, the data objects (i.e. "42") are copied to newspace (if they have not already been copied) and the reference is updated to reflect the new location 410 (FIG. 4C). Since newspace 402 is scanned from the same end that allocation first occurred and the scan is in the direction of new allocation, data objects copied during the scan will always be placed at the end of newspace 402 where the collector has yet to scan. When the scanning pointer reaches the new allocation pointer, the garbage collection is complete.

Figure 4D:
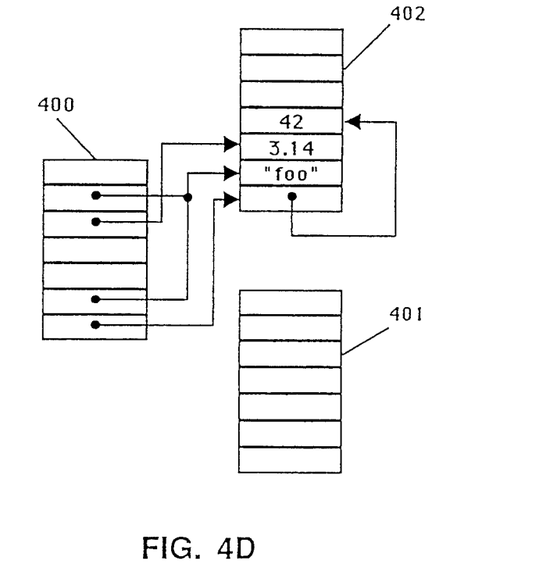

At this stage, all references into oldspace 401 are gone; all that remain are dead objects and forwarding pointers. Oldspace 401 and newspace 402 are interchanged and the user computation can continue. The interchange of the spaces reclaims all space in oldspace 401 for use as newspace during the next collection (FIG. 4D). This algorithm permits only half of the available dynamic data memory to be allocated before a garbage collection must take place; the second half of the memory remains idle and empty, waiting for copying to occur.

A disadvantage of the stop and copy scheme is that of having to actually access the heap when a reference to oldspace is encountered. The least predictable accessing in garbage collection is that involved with marking or determining if a data object needs to be copied. If there is only one reference in existence for each data object, the same number of heap references are required for the "mark and sweep" and the "stop and copy" schemes. However, there is often more than one reference to a data object. In the mark and sweep scheme, a small table of mark bits can used to avoid actually making accesses to a large heap for any but the first reference mark encountered. The stop and copy scheme essentially requires making random heap accesses to obtain the forwarding information.

Another disadvantage of stop and copy garbage collectors is that these collectors cannot be used in computer systems that have "ambiguous roots" (i.e. objects in the root which may or may not be pointers). An ambiguous root may in fact be a piece of data, such as a loop counter. Since all accessible objects are copied and moved to new locations in memory, all pointers to the accessible objects must be found and changed so that these pointers continue to point to the appropriate objects.

It is unacceptable for an object which might be a pointer, but is in fact a data value, to be changed in value by the garbage collector. Thus, the stop and copy collector must be able to distinguish between pointers and other data, and must be able to find all pointers to accessible objects. This requirement is sometimes called "root finding". In some implementations, root finding is not a problem, and thus a stop and copy garbage collector can be used. However, other computer environments present more serious problems in finding roots.

In U.S. Pat. No. 4,797,810 to McEntee, et al., the garbage collector is generational and implements a stop and copy collection scheme. Each area in the individual address space is divided in up to four generations, with the youngest generation being the most volatile and resident in the main computer memory. During the copying of objects from old space to new space, objects are "tenured" or promoted from one generation to an older generation. An object is promoted when it has survived a predetermined number of garbage collections, thereby demonstrating that it likely will not be reclaimed by the collector in the immediate future. Thus, the garbage collector operates on an area-by-area basis upon objects which are contained in one of two semi-spaces; old space or new space, and during the garbage collection process, all accessible objects are copied from old space to new space.

In the collection scheme of McEntee et al., the garbage collector and the virtual memory processes can act on memory concurrently. Consequently, the garbage collector operates incrementally in distinction to "pausing" collectors. This method still exhibits the problems of a standard "stop and copy" system, in that it still requires fairly random heap accesses to obtain forwarding information and the ability to recognize ambiguous roots.

Other U.S. patents related to this issue are: U.S. Pat. Nos. 4,757,438; 4,807,120; 4,814,971; 4,907,151; 4,961,137; 4,989,134; and 4,989,137.

U.S. Pat. No. 4,807,120 to Courts describes a garbage collection system for digital computers that classifies memory objects into generations. Objects in older generations that need to reference younger generations must do so indirectly through indirection cells located in the older generation. When a generation is collected, the indirection cells in that generation are defined to be old space and collected in the usual manner. The system also includes read and write barriers which function to filter out undesirable pointers based on the classification and volatility of memory regions to which they point or are destined to be stored.

U.S. Pat. No. 4,814,971 to Thatte describes a virtual memory recovery system in which periodic check points are taken of the state of the computer system and its virtual memory. If a system crash occurs, the machine state can be rolled back to the check point state and normal operation is restarted. In the garbage collection system of *Thatte*, deleted objects are specially marked as "tombstoned" when they are deleted. All of the outstanding pointers to a tombstoned block are detected by the garbage collector and then destroyed. When no pointers to a tombstoned block are left its space is automatically reclaimed.

U.S. Pat. No. 4,907,151 to Bartlett describes a garbage collection method providing a heap of storage space for storing program objects generated by a task. A root storage area stores information including ambiguous pointers which may or may not point to program objects stored in the heap. Garbage collection is performed by promoting and retaining all pages in the heap which are referenced by hints within the root storage area, and by copying into previously unallocated pages all other accessible program objects in the heap.

U.S. Pat. No. 4,961,137 to Augusteijn et al. describes a method and apparatus for establishing a global binary assertion in a multi-processor environment. The logical operation may represent a garbage collection system, wherein originally root items are marked gray and all other items white. In a marking phase, all gray items are successively accessed. After verifying any other item referred to by such gray item, and if white, discoloring the other item to gray, the original item is discolored to black. When no gray items are left globally, the remaining white objects are treated as garbage.

U.S. Pat. No. 4,989,134 to Shaw describes a method for enhancing data storage efficiency by reducing a base set to be garbage collected. To facilitate this, the system utilizes "dirty page mapping". Dirty page maps contain a listing of all locations in a memory region, or page, that have been written to since the last garbage collection process. A secondary memory dirty page map and a primary memory dirty page map are developed and utilized to reduce the size of the base set by allowing the garbage collection routine to ignore any page in the base set which has not been written to.

U.S. Pat. No. 4,989,137 to Oxley et al. describes a computer memory system for use with a user processor that provides for automatic memory operation independent of the user processor. The user cannot access the memory directly, but must access the memory through a binding register unit. The logical memory system is controlled by a separate memory management unit which manages the physical memory of the system and which manages the memory to have the logical memory system appearance to the user processor. Garbage collection is performed automatically without requiring that the ongoing processing steps of the user processor be halted during the garbage collection process.

SUMMARY OF THE PRESENT INVENTION

The present invention provides a garbage collector that runs in a different process than the process being scanned. With this method, the process being scanned communicates its memory state ("a memory snapshot") to a garbage collecting process CGC"), the GC process scans the memory and sends back the information about garbage. As a result, the present invention permits garbage collection to be performed asynchronously while still permitting the scanned process direct access to memory. The process being scanned for garbage is interrupted only briefly, to obtain the memory snapshot. The scanned process then runs without interruption while the garbage collection is being performed.

This method makes the assumption that if an object is garbage at the time of the memory snapshot it remains garbage any time later, since new pointers to that object cannot be created during collection. The method further considers the case where the results of a cache computation is a collectable object itself. The method includes maintaining a list while a collection is in progress of all the objects being given away from the cache. When an object is received as garbage from the GC, it is only freed if it is not on the list.

The garbage collecting process is performed using a conservative scan. The garbage collector determines if an object is garbage by scanning the memory address space and comparing the value found in each scanned memory address to see if the value matches the candidate for garbage. If no match is found, this means that the candidate for garbage is not referenced and therefore, is garbage.

DETAILED DESCRIPTION OF THE INVENTION

A method and apparatus for asynchronous garbage collection is described. In the following description, numerous specific details are set forth in order to provide a more thorough understanding of the present invention. It will be apparent, however, to one skilled in the art, that the present invention may be practiced without these specific details. In other instances, well known features have not been described in detail so as not to obscure the present invention.

The present invention consists of a garbage collector that is designed to run as an individual process. The garbage collection process receives a copy of the memory state (a memory "snapshot") of the process being collected. The garbage collector (GC) scans the memory snapshot and sends back information about garbage to the collected process. Because the garbage collector is run as a separate process, it is considered an asynchronous operation. This method acts under the assumption that objects that are garbage at the time of the memory snapshot are garbage anytime later, since pointers to that object cannot be created during the collection process.

To prevent cache references from blocking garbage collection, pointers within the cache are disguised so as to be unrecognizable to the garbage collection process. At other times, a list of the objects in the cache is kept to be compared with the garbage list prepared by the garbage collector. Only objects that are on the garbage list and not on the cache list are freed.

The preferred embodiment of the present invention is implemented in an object oriented programming environment, though it can be practiced in other programming environments as well.

Object-oriented programming is a method of creating computer programs by combining certain fundamental building blocks and creating relationships among and between the building blocks. The building blocks in object-oriented programming systems are called "objects." An object is a programming unit that groups together a data structure (instance variables) and the operations (methods) that can use or affect that data. Thus, an object consists of data and one or more operations or procedures that can be performed on that data. The joining of data and operations into a unitary building block is called "encapsulation." In object-oriented programming, operations that can be performed on the data are referred to as "methods."

An object can be instructed to perform one of its methods when it receives a "message." A message is a command or instruction to the object to execute a certain method. It consists of a method selector (name) and arguments that are sent to an object. A message tells the receiving object what to do.

One advantage of object-oriented programming is the way in which methods are invoked. When a message requesting execution of a method is sent to an object, it is not necessary for the message to instruct the object how to perform that method. It is only necessary to request that the object execute the method with that name. This greatly simplifies program development.

The preferred embodiment of the present invention implements an object-oriented programming system using objective C language. Objective C is an extension to ANSI C that supports the definition of classes of objects and provides syntactic and run-time support for sending messages to objects. This language model is partially derived from SmallTalk and has been described in "Object-Oriented Programming; An Evolutionary Approach," Brad J. Cox, Addison-Wesley 1986 and in "SmallTalk-80: The Language and its Implementation," Adele Goldberg, Dave Robson, Addison-Wesley 1983.

The present invention may be implemented in a computer system using an object-oriented operating system, however, it may also be implemented in other computer environments. One such object-oriented operating system is known as the "Mach" operating system and is implemented on computers manufactured by NEXT, Inc., the Assignee of the present invention.

Figure 6:
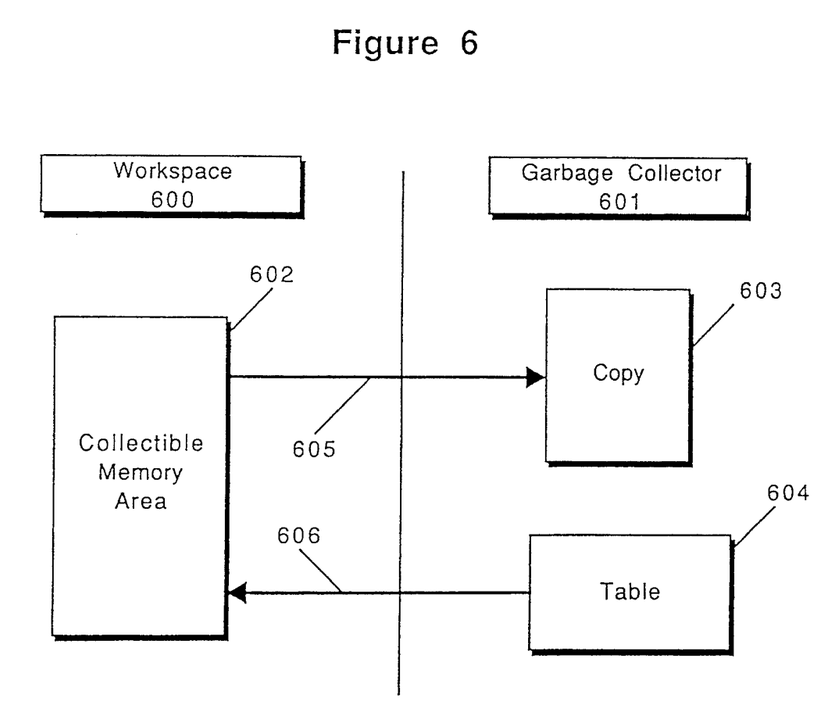
FIG. 6 is a block diagram illustrating the garbage collection method of the present invention.

A block diagram of the present invention is illustrated in FIG. 6. An application or process, identified as "workspace 600" in FIG. 6 includes a collectible memory area 602. During operation of the process in the workspace 600, certain memory address locations become referenced (i.e. pointed to using its address). In addition, some objects are unreferenced, namely no memory contents points to it in that process. The present invention provides a method for collecting these "garbage" memory locations without disturbing the operation of the process.

Still referring to FIG. 6, a separate garbage collector process 601 is implemented. The collectible memory area 602 transfers a copy 603 of its memory at a certain time as, for example, a message 605. The garbage collector process 601 then performs a garbage collection. In the preferred embodiment of the present invention, the garbage collection may be a conservative garbage collection for example. However, any suitable garbage collection process can be utilized without departing from the scope or spirit of the present invention. The garbage collector process 601 generates a table 604 that identifies unreferenced free objects that may be reclaimed in the workspace 600. This table 604 is provided from the garbage collection process 601 to the workspace process 600 via, for example, a message 606.

Although only a single process is shown being collected in FIG. 6, the garbage collector of the present invention can act as a garbage collector server and serve a plurality of processes. In such an implementation, each process sends a copy of its collectible memory area to the garbage collector which then processes the copy and provides a table of memory addresses than can be reclaimed to the original process.

The result of the present invention is an asynchronous garbage collection that works outside of the scan process. This results in more efficient operation of the scan process while still providing efficient memory usage. In the preferred embodiment of the present invention, the scan process and garbage collector process may reside on different processors or on the same processor, in a multi-tasking environment.

The collectible memory area 602 is configured and defined so that uncollectible memory areas are not scanned. This reduces the amount of memory that must be transferred to the garbage collector process and improves efficiency by not needlessly scanning memory addresses that cannot be collected. For example, some memory address locations do not contain collectible objects. These areas include memory addresses used to store program code, top of memory stack, and explicitly reserved and registered areas. In addition, objects associated with a specific process such as workspace 600 can be assigned to a particular range of memory so that addresses outside that range need not be scanned for that particular process.

It is a common technique when writing software to perform caching operations. However, caching can inhibit the garbage collection process. In the case where the cache stores the result of a computation applied to an object, the cache is, conceptually, a list of associations [object→value]. For simplicity, assume that the value is an atomic value (such as integer). The problem encountered with such a cache is that because it contains a given object, this object is never collected, even if the cache contains the only pointer to that object. The present invention deals with this problem by disguising the pointer. For example, if it is known that object pointers are always even, then the pointer value is incremented by one so that is it odd. The garbage collector would then be unable to recognize the pointer. Another way of disguising the pointer is to pass the pointer value through an "exclusive or" gate with a standard constant. Because the pointer is disguised, the cache will not prevent the object from being collected. Then, when the object is collected, it is first removed from the cache.

There is also the possibility that the cache computation is a collectible object itself. In this case, the cache, conceptually, is a list of associations [key→object]. If the solution for the previous case is applied for this instance, everything behaves properly except for the case when the cache is used during the snapshot and the actual freeing of the object. In essence, one of the assumptions of the asynchronous garbage collector of the present invention is violated, i.e. that if an object is garbage, there is no way for new pointers to that object to be generated.

The solution to this new problem consists in keeping a list, while the collection is in progress, of all the objects that are being given away from the cache, and when an object is received as garbage from the garbage collector, to only free the object if it is not in the list.

A useful example of the previous problem is the collection of atoms. The problem is to guarantee unicity of character strings. Consider an atom to be a unique string (as in Lisp terminology). In order to maintain the uniqueness of the character strings, a table mapping all of the previous character strings into their previous corresponding atoms must be retained. This table creates the same problem previously exposed by the cache memory. In the present invention, the mapping table is treated in the same fashion as the cache memory of the previous problem (i.e. disguising of pointers, etc.). Thus, the garbage collection process can collect atoms even in the presence of pointers in the mapping table.

Figure 7:
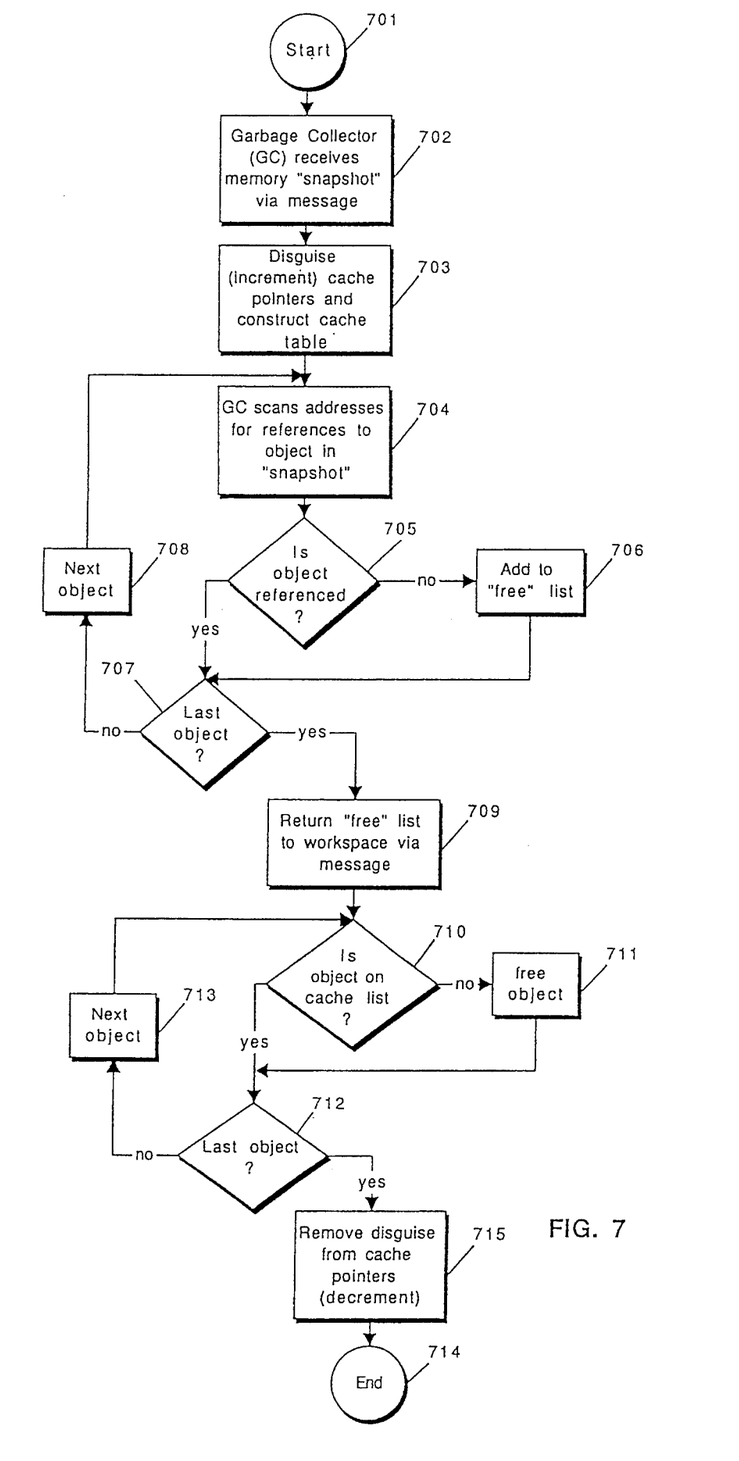
FIG. 7 is a flow diagram illustrating the garbage collection process of the preferred embodiment of the present invention.

A flow diagram illustrating the operation of the present invention is illustrated in FIG. 7. The process begins at step 701. At step 702, the garbage collector process receives memory "snapshot" via a message from the process that is being scanned. At step 703, cache pointers are disguised and a cache table is constructed.

At step 704, the garbage collection process scans the addresses in the memory snapshot for references to other objects. Decision block 705, the argument "is object referenced?" is made. If the argument is false, the system proceeds to step 706 and that object is added to the "free" list. After step 706, or if the argument at step 705 is true, the system proceeds to decision block 707. At decision block 707, the argument "last object?" is made. If the argument is false, the system proceeds to step 708 and the next object is obtained before returning to step 704. If the argument at decision block 707 is true, the system proceeds to step 709. At step 709, the system returns the list of free memory addresses to the workspace via a message.

At decision block 710, the argument "is object on cached list?" is made to determine if objects on the free list are also on the cache list. If the argument at block 710 is false, the system proceeds to step 711 and identifies that object as a free object. After execution of step 711, or if the argument at decision block 710 is true, the system proceeds to remove the disguise from the cache pointers at step 715. After step 715, the system proceeds to decision block 712.

At decision block 712, the argument "last object?" is made. If the argument is false, the system proceeds to step 713 and obtains the next object from the free list for comparison at decision block 710. If the argument at decision block 712 is true, the process ends at step 714.

In one embodiment of the present invention, the caching scheme is not implemented and steps 702, 710–713 and 715 are not implemented.

The present invention, when implemented in the context of objective C (or another language that supports forwarding), can apply the garbage collector to objects that are allocated with a regular allocation strategy (allocate-free). For example, the GC can be used to collect objects allocated by a library that uses a regular allocation strategy, and over which the user has no control.

Figure 5A:
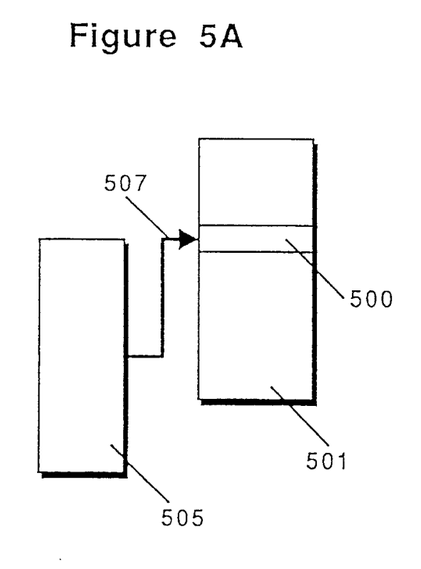
FIGS. 5A–5B illustrates a reference forwarding method for collecting objects allocated in an uncollectible memory area.

FIG. 5A illustrates an objective C object which is allocated such that it is not within the area of collectible objects. The objective C object, image 500, lies within an uncollectible memory area 501. Workspace 505 provides a pointer 507 to image 500. A standard garbage collector is not able to collect image 500 because image 500 does not lie within the collectible domain.

Figure 5B:
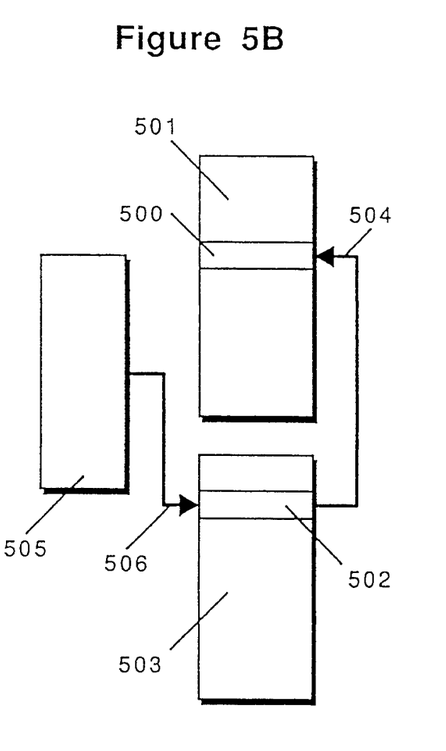

The present invention takes advantage of environments which support automatic forwarding by creating another objective C object, as in FIG. 5B. Workspace 505 contains a pointer 506 to image proxy 502, which lies within collectible area 503. The image proxy 502 contains pointer 504, which points to image 500 within uncollectible area 501. Image proxy 502, points to the image 500 and forwards every message to it. The image proxy behaves just like the original image, except the user now has control over its lifetime. Therefore, the image proxy can be allocated in the area of collectible objects where the garbage collector can be applied. If the original image is substituted by the image proxy in every place, the proxy will get collected only when its unused, which in turn means that the image is unused. At that time, both objects, the original image and the image proxy, can be deallocated.

An example of an environment which supports automatic forwarding is described in U.S. patent application Ser. No. 07/695,316 filed on May 3, 1991 entitled "METHOD FOR PROVIDING AUTOMATIC FORWARDING OF MESSAGES AND METHODS" and assigned to the assignee of the present invention.

Automatic Forwarding of Messages

The present invention, in its preferred embodiment, takes advantage of a method referred to as "automatic forwarding of messages." This method is the subject of copending patent application Ser. No. 07/695,316 filed May 3, 1991, entitled "METHOD FOR PROVIDING AUTOMATIC FORWARDING OF MESSAGES AND METHODS" and assigned to the assignee of the present invention. This method is described below.

In objective C, when an object receives a message that contains a method that the object does not recognize, an exception is provoked leading to an error. The present invention, instead of provoking an exception, redirects the message to an acquaintance that can understand the message. For example, if an object receives a message containing a method that the receiving object does not contain, the message is forwarded to an acquaintance object that does contain the method. This provides the advantage of inheriting the method from the acquaintance object but does not require the first receiving object to actually have the method itself. This reduces code size the memory requirements.

The present invention has a plurality of uses. For example, a new object class can be defined so that one of its instances (attributed object) adds an attribute to another object (its forwardee). In that situation, automatic forwarding occurs when an attributed object receives a message that is irrelevant to the attribute, and the method is forwarded to the forwardee. In another situation, some functionality is applied before and/or after the forwarding. This can be used in the case of a locking data structure where all methods must be redirected to the locked data after acquiring the lock, and where the lock must be released after the execution of the forwarded method. The present invention also has use in the case of forwarding messages in a distributed environment where there is no explicit forwardee. Rather, there is a network address of the forwardee.

The implementation of the present invention in the preferred embodiment requires trapping the "message not recognized" exception of objective C, retrieving all of the arguments of the unrecognized message, and sending the "forward::" message to the object.

The resulting automatic forwarding system of the present invention is more powerful than multiple inheritance and is transparent to the programmer and developer. The system is general, because the forwardee is not explicit, thus permitting solutions to a large class of problems.

The present invention uses the forward:: command so that subclasses can forward messages to other objects. The format is forward: (SEL) aSelector:(marg_list) argFrame. When an object is sent an aSelector message, and the run time system cannot find an implementation of the method for the receiving object, the run time system sends the object a forward:: message to give it an opportunity to delegate the message to another object. If the forwardee object cannot respond to the message either, it also has the opportunity to forward the message. A forward:: message is generated only if a selector method is not implemented by the receiving object's class or by any of the classes it inherits from.

The forward:: message thus allows an object to establish relationships with other objects that will, for certain messages, act on its behalf. The forwarding object is, in a sense, able to "inherit" some of the characteristics of the object it forwards the message to. The forwarding object is not limited to the forwardees it may select, and a forwardee relationships may be formed with more than one object at the same hierarchical level. Therefore, the present invention provides the advantages of multiple inheritance without the code size problem.

In addition to forwarding messages, the forward:: method can locate code that responds to a variety of different messages, thus avoiding the necessity of having to write a separate method for each selector.

If implemented to forward messages, a forward:: method has two tasks. First, to locate an object that can respond to the aSelector message (this need not be the same object for all messages). Second, to send the message to that object using the performv:: and performv method.

Figure 8:
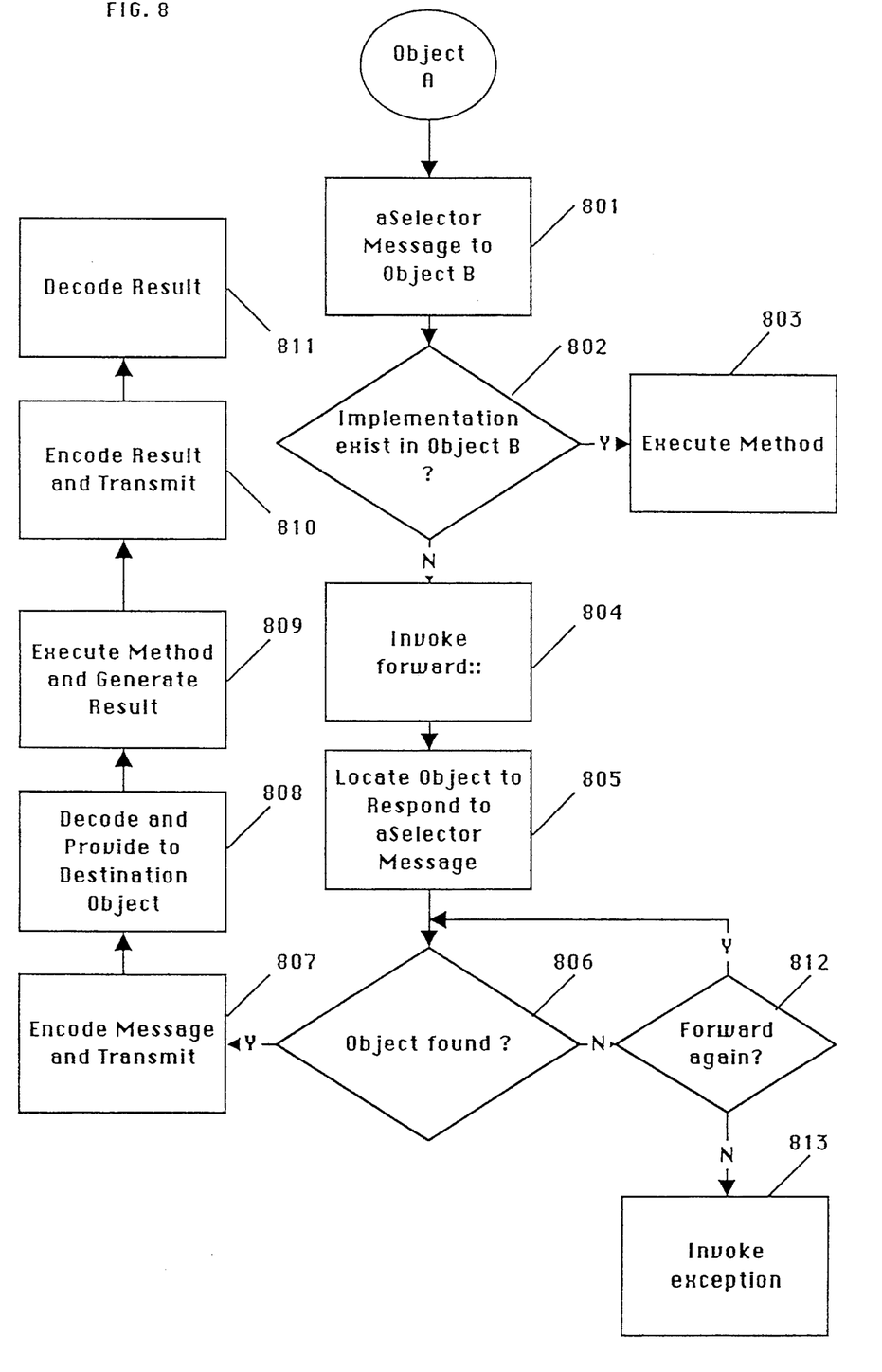
FIG. 8 is a flow diagram illustrating an automatic forwarding technique that may be used with the present invention.

The operation of the present invention is illustrated in the flow diagrams of FIG. 8. At step 801, Object A sends an aSelector message to object B. At decision block 802, the argument "Implementation exists in Object B?" is made. If the argument is true, the method of the aSelector message can be executed by object B. If that is the case, the system proceeds to step 803 and the method is executed. If the argument is not true, the system proceeds to step 804 and invokes the forward:: method.

The forward:: method then performs the first of its two tasks at step 805. Namely, it attempts to locate an object to respond to the aSelector message. At decision block 806, the argument "Object found?" is made. If the argument is true, then forward:: has successfully found an object to respond to the aSelector message. In the present invention, the forwarding object is typically a proxy object.

The system then proceeds to step 807, the message is encoded and transmitted as an operating system message to another process. At step 808, the operating system message is decoded and provided to the destination object. At step 809, the destination object executes the method of the message to generate a result. At step 810, the result is encoded and transmitted to the first process as an operating system message. At step 811, the message is decoded and the result is provided to the sending object.

If the argument at decision block 806 is not true, the system proceeds to decision block 812. At decision block 812, the argument "forward again?" is made. If the argument is true, the message is forwarded again and a search for an object to respond to the message is made. If the argument is false, the system proceeds to step 813 and an exception (error) is invoked.

In the case in which an object forwards messages to just one destination, a forward:: method could appear as follows:

- forward: (SEL)aSelector :(marg_list)argFrame

-continued

```
{
  if ([friend respondsTo:aSelector])
    return [friend performv:aSelector:argFrame}:
  return [self doesNotRecognize:aSelector];
}
```

ArgFrame is a pointer to the arguments included in the original aSelector message. It is passed directly to performv:: without change. The default version of forward:: implemented in the object class invokes the does not recognize: method. It does not forward messages. Thus, if a user chooses not to implement forward:: methods, unrecognized messages will be handled in the usual way.

The objective C run time code routines for implementing automatic forwarding of messages is as follows:

```
// provide a default error handler for unrecognized messages
static id_forward (id self, SEL sel, . . . )
{
  id retval;
  // the following test is not necessary for Objects (instances of Object)
  // because forward:: is recognized.
  if (sel == @selector (forward::)){
    _objc_error (self, _errDoesntRecognize, SELNAME (sel));
    return nil;
  }
  retval = [self forward: sel: &self];
  return retval;
  {
    Method smt = (Method) objc_malloc (sizeof (struct objc_method));
    smt→method_name = sel;
    smt→method_types = "";
    smt→method_imp = (IMP) _forward;
    _cache_fill (savCls, smt);
  }
  {
    Method smt = (Method) objc_malloc (sizeof (struct objc_method));
    smt→method_name = sel;
    smt→method_types = "";
    smt→method_imp = (IMP) _forward;
    cache_fill (savCls, smt);
  }
  //the class does not respond to forward: (or, did not supply a dest)
  {
    Method smt = (Method) objc_malloc (sizeof (struct objc_method));
    smt→method_name = sel;
    smt→method_types = "";
    smt→method_imp = (IMP) _forward;
    _cache_fill (savCls, smt);
  }
  return (IMP) _forward;
}
```

I claim:

1. A method for identifying free memory address locations in a computer system comprising the steps of:
   executing a first process in said computer system that references a first collectible memory area in said computer system, said first collectible memory area having allocated and unallocated memory address locations;
   executing a second process in said computer that identifies free memory address locations;
   transferring a first image of a memory state of said first collectible memory area of said first process to said second process;
   scanning each address in said first image by said second process to determine if said address is referenced;
   adding by said second process each address of said first image that is not referenced to a list of unallocated memory addresses;
   transferring by said second process said list of unallocated addresses from said second process to said first process.

2. The method of claim 1 wherein said first process is executed on a first processor.

3. The method of claim 2 wherein said second process is executed concurrently with said first process on said first processor.

4. The method of claim 2 wherein said second process is executed on a second processor.

5. The method of claim 1 wherein said first process and said second process are executed asynchronously.

6. The method of claim 1 further including the steps of:
   executing in said computer system a third process that references a second collectible memory area having allocated and unallocated memory address locations;
   transferring a second image of a memory state of said second collectible memory of said third process to said second process;
   scanning each address in said second image by said second process to determine if said address is referenced;
   adding each address of said second image that is not referenced to said list of unallocated addresses;
   transferring said list of unallocated addresses from said second process to said third process.

7. The method of claim 1 wherein said first collectible memory area contains cache pointers further including the steps of:
   disguising said cache pointers by said computer system by changing the value of said cache pointers;
   generating a table of said cache pointers by said computer system;
   comparing said list of unallocated memory addresses with said table of said cache pointers;
   adding an object to said list of unallocated addresses that is not found in said table.

8. The method of claim 7 wherein said step of disguising said cache pointer is accomplished by adding 1 to said cache pointer.

9. A method for identifying free memory address locations in a computer system comprising the steps of:
   executing in said computer system a first process that references a first collectible memory area in said computer system, said first collectible memory area having allocated and unallocated memory address locations and pointers to cache in said computer system;
   executing in said computer system a second process that identifies free memory address locations;
   disguising said cache pointers by said computer system by changing the value of said cache pointers;
   generating a table of said cache pointers by said computer system;
   transferring a first image of a memory state of said first collectible memory area of said first process to said second process;
   scanning each address in said first image by said second process to determine if said address is referenced;

adding each address of said first image that is not referenced to a list of "free" addresses;

transferring said list of "free" addresses from said second process to said first process;

comparing said list of "free" memory addresses with said table of said cache pointers;

freeing an object on said list that is not found in said table.

10. The method of claim 9 wherein said first process is executed on a first processor.

11. The method of claim 10 wherein said second process is executed concurrently with said first process on said first processor.

12. The method of claim 10 wherein said second process is executed concurrently with said first process on a second processor.

13. The method of claim 9 wherein said first process and said second process are executed asynchronously.

14. The method of claim 9 further including the steps of:

executing in said computer system a third process that references a second collectible memory area having allocated and unallocated memory address locations;

transferring a second image of a memory state of said second collectible memory area of said third process to said second process;

scanning each address in said second image by said second process to determine if said address is referenced;

adding each address of said second image that is not referenced to said list of "free" address;

transferring said list of "free" addresses from said second process to said third process.

15. The method of claim 9 wherein said step of disguising said cache pointer is accomplished by adding 1 to said cache pointer.

16. The method of claim 9 wherein said step of disguising said cache pointer is accomplished by passing each pointer value through an "exclusive or" gate with a standard constant.

* * * * *